Sept. 17, 1940.  C. A. CHRISTENSEN  2,215,172
CONTROL VALVE
Filed Dec. 4, 1939   2 Sheets-Sheet 1

INVENTOR.
CLARENCE A. CHRISTENSEN
BY
ATTORNEY.

Sept. 17, 1940.  C. A. CHRISTENSEN  2,215,172
CONTROL VALVE
Filed Dec. 4, 1939  2 Sheets-Sheet 2
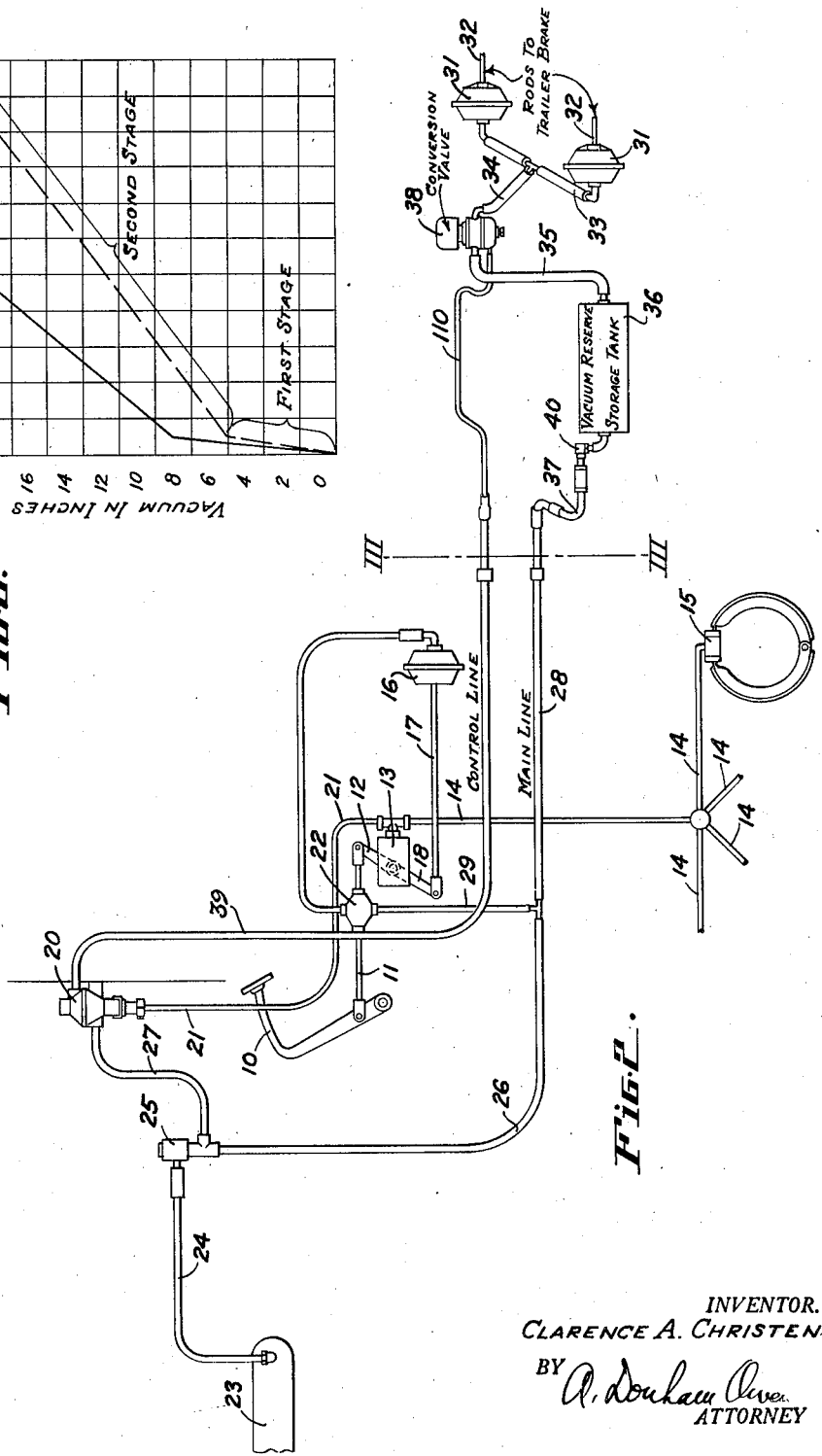
INVENTOR.
CLARENCE A. CHRISTENSEN
BY
ATTORNEY Patented Sept. 17, 1940

2,215,172

UNITED STATES PATENT OFFICE 2,215,172

CONTROL VALVE

Clarence A. Christensen, San Mateo, Calif.

Application December 4, 1939, Serial No. 307,461

12 Claims. (Cl. 188—3)

My invention relates to a control device for use in pressure operated systems.

One object of my invention is to provide a device whereby independent power actuating systems employing different fluids can be controlled to operate in a predetermined manner upon the energization of one of them.

One of the objects of my invention is also to provide a device which makes it possible to interpolate a plurality of pressures in a hydraulic system into correlated pressures in a vacuum or air actuated system, and particularly where it is important as in trailer operation for the trailer brakes to begin to take hold ahead of the tractor brakes.

Another object of my invention is to provide a compact, fully automatic regulating means for operating remote vacuum or air control systems in correlation to hydraulic power from another and separate apparatus, and to provide a device which will give two or more different operating ranges between these two pressure systems.

Another object is to provide a device which can be adjusted to give a predetermined valve action in relation to the pressure applied to the valve.

A further object is to provide a device for use in independent power applying systems in which the actuating pressure in one system is used to gauge the degree of actuation in the other system.

Another object is to provide a unitary self-contained device having no exposed parts and capable of being mounted anywhere on a vehicle.

One application of my invention is in the actuation of brakes on separate vehicles operated in connected relation by a driver who controls the plurality of vehicles from one of them. The control vehicle is usually known as the tractor and the other one or more vehicles as a trailer or trailers. The tractor and trailer (or trailers) are each equipped with brakes because the heavy loads carried do not allow for quick safe stops to be made with the brakes on the tractor alone, or vice versa. I believe the ideal situation is for the brakes on the rear vehicle or vehicles to take hold in advance of the tractor so that no push is imposed on the leading vehicle.

My device solves a very serious problem arising in trailer-tractor braking because with it the valve can be constructed to give any desired vacuum energy for the trailer brakes for a given pressure on the tractor brakes. This permits the trailer brakes to be applied in advance of the tractor brakes, thereby preventing "jackknifing." "Jackknifing" describes a situation where the trailer is not decelerated as fast as the tractor, and the trailer pushes the rear end of the tractor to the right or left, especially on turns.

Not only do road conditions vary but the braking systems on two vehicles of the same make may vary in their operating characteristics, and there is invariably a difference in effectiveness of the braking systems on a tractor and trailer. For example, a tractor may have self-energizing brakes and a consequent low line pressure.

My device permits a delicate control between a plurality of brake systems no matter how light a pressure actuates one or how heavy a pressure is required in another. Not only should there be an advance interval of braking of the trailer, but then as the brakes on all the connected vehicles are further applied, the correlated action should be such that all the brakes reach maximum application together. The two-stage effect is very important in carrying the braking pressures in each vehicle to a maximum.

Another situation cared for by my present invention is the case where the brakes on the tractor use a different energizing medium than do the brakes on the trailer. This is where the tractor has a hydraulic system and it is either not feasible to connect this direct to the trailer, or the trailer has a mechanical linkage to its brake cam levers and a pressure energized chamber for actuating this linkage, or the trailer has some other system, such as a hydraulic with air chamber actuation.

In every case it becomes important to correlate the pressure developed in the hydraulic system on the tractor at successive stages of brake application to the pressure in the separate system which actuates the trailer brakes. This correlation of pressures must be such that the trailer brakes will not be partially applied when the tractor brakes are full applied, and vice versa.

Another problem arising in this type of tractor-trailer braking is the fact that the trailer brakes are usually actuated by vacuum developed in the intake manifold of the engine (or by a vacuum pump) and this vacuum has a top limit near 24 to 27 inches of mercury at sea level. The pressure on the hydraulic brake actuating fluid on one tractor may be three hundred fifty pounds at maximum brake application and on another tractor it may be a thousand pounds. These systems must be harmonized, preferably to give first a predetermined amount of trailer brakes with a very low line pressure on the tractor—in fact a line pressure that is often too low for any braking value. Then after this initial trailer brake action is reached, the balance of the vacuum energy is controlled to distribute the further braking load to the brakes on all the vehicles in the desired ratio for the particular road and load conditions My invention provides a compact unitary device, capable of translating the hydraulic brake fluid pressure into the correct amount of valve actuation to give a correlated vacuum pressure for equal actuation of the brakes on both vehicles, or any desired ratio of braking pressure between tractor and trailer; or a two-stage operating range.

One form of the invention is shown in the accompanying drawings, forming a part of this specification, in which:

Fig. 2 is a diagrammatic lay-out in perspective of a complete installation employing the valve; and Fig. 3 is a chart portraying sample results obtained from the invention.

Figure 1:
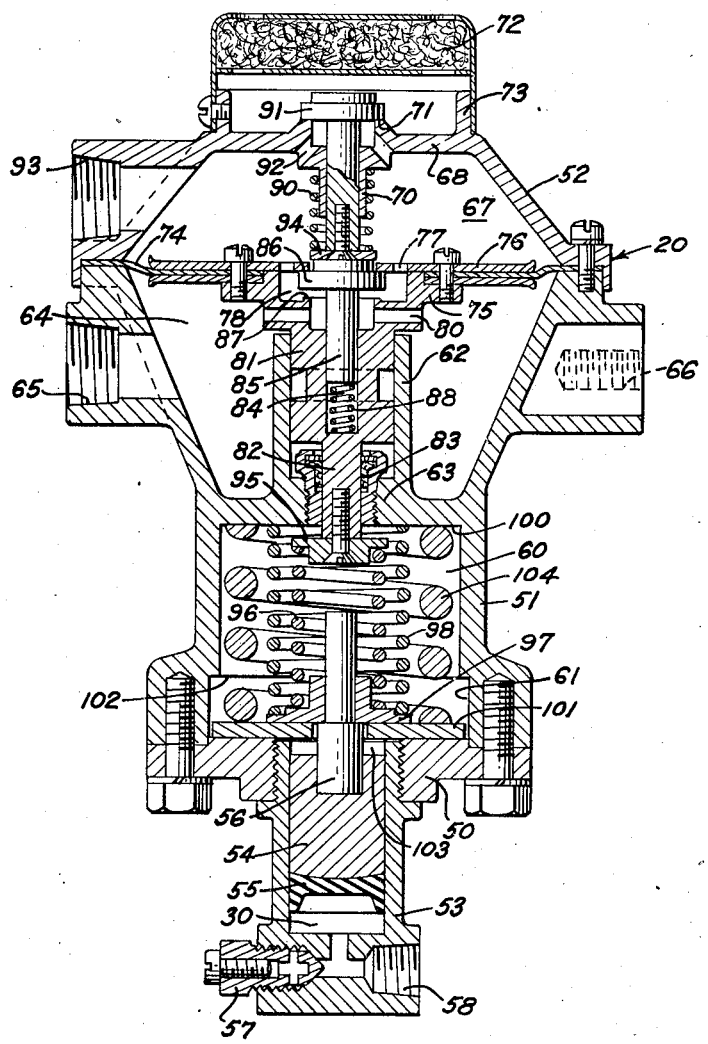
Fig. 1 is a view mostly in cross-section showing the valve in elevation.

One environment in which my invention is useful is shown in Fig. 2. This comprises a hydraulically actuated brake applying installation on a tractor lying to the left of vertical line III—III and a vacuum actuated brake applying installation on a trailer lying to the right of said line.

The tractor unit is where the control originates and has the conventional foot lever 10 for applying force to the rod 11 which in turn actuates lever 12 on the hydraulic master cylinder 13. Inside 13 is a master cylinder, filled with oil or other liquid, having pipes 14 communicating therewith and connected also to brake actuating cylinders 15 (one for each wheel). A piston in the master cylinder is actuated by movement of lever 12 which forces liquid through pipes 14 into cylinders 15. Upon release of pedal 10 the piston returns and the liquid moves out of cylinders 15 back into the master cylinder.

My valve 20 connects into any pressure line from the master cylinder, for example, by pipe 21 so that whatever pressure is built up in the brake applying cylinders 15 is also present in valve 20.

To minimize the physical effort which the driver must apply to brake pedal 10, a pressure actuated "brake booster" power chamber 16 may be connected by rod 17 to lever 18, the latter being rigidly connected to the same shaft as lever 12. Such a brake booster is not required however. Foot valve 22 is actuated by rod 11 and is the well-known vacuum type (see for example Bragg et al., No. 1,865,505, granted July 5, 1932). Use is made in this installation of the reduced pressure in the engine intake manifold 23, which is maintained in pipes 24, 26, 27, 28 and 29. When lever 10 is depressed it opens valve 22 and lowers the pressure in power chamber 16 so that atmospheric pressure can move rod 17 to the right. Movement of lever 18 forces the liquid in pipes 14 and 21 into the chambers 15 and 30 respectively.

In the example, the trailer is equipped with air suspended type power chambers 31 which apply their power to brake rods 32. The invention, however, is not limited to use with air suspended type power chambers. Air is exhausted from power chambers 31 by the engine suction intake 23 through pipes 33, 34, 35, 36, 37, 28, 26 and 24. Conversion valve 38 is a well-known type in power installations and requires no present explanation except to state that it converts the vacuum suspended control used with valve 20 into the air suspended system required for chambers 31 (see for example Coates U. S. Patent No. 467,921, granted February 2, 1892). Check valve 40 and tank 36 permit of enough vacuum storage to actuate the trailer brakes if the trailer should break away from the trunk while under way.

The valve 20 which makes possible the combining of the hydraulic system on the tractor with the air operated system on the trailer, and in addition accomplishes the many other advantages already enumerated, is a self-contained unit and can be located at any desired place on the tractor.

In the form chosen for illustration it is made up of a three-piece housing 50, 51, 52.

In the lower side of 50 is arranged the hydraulic piston assembly 53 having the cylinder chamber 30, piston 54, packing 55, pin 56, air bleed plug 57 and threaded inlet 58. The latter receives pipe 21 leading from master cylinder 13. The pressures in chamber 30 correspond to the pressures in the brake cylinders 15.

The problem is to interpolate these pressures into the desired vacuum pressures to give the two stage effect so beneficial to tractor-trailer operation.

In the central housing portion 51 is the bore 60 and enlarged concentric bore 61. Its upper portion has the cylinder 62 separated by wall 63, and the flared chamber portion 64. A threaded inlet 65 receives pipe 27. A threaded boss 66 facilitates mounting to the vehicle body or frame.

The upper housing portion 52 is flared to provide a chamber 67. Its wall 68 is bored to provide a valve guide 70 and seat 71. An air cleaner 72 is fitted on flange 73.

A diaphragm 74 is fitted between chambers 64 and 67 and at its central portion is held between a web 75 and 76. The latter has holes 77 communicating with passages 78 and 80 in web 75. The latter may be formed integral with stem 81, which has a reduced stem portion 82 extending through a packed bore 83 in wall 63 into chamber 60. Stem 81 has a valve guide 84 to receive the stem 85 of poppet valve 86. Spring 88 (of about three pound strength) normally holds valve 86 off seat 87 but being lighter than spring 90 (of about six to eight pound strength) permits the valve to seat when stem 81 is moved upwardly.

Poppet valve 91 is normally retained on its seat 71 by spring 90. Washer 94 retains the spring in place. When lifted, it allows air to enter chamber 67 via passages 92. The bore 93 is threaded to receive pipe 39, the control line to conversion valve 38.

On the lower end of piston stem 82 is a washer 95 shaped to support one end of spring 96 whose other end bears on washer 97. Washer 97 also has a ledge to receive return spring 98, which bears at its other end on the end wall 100 of bore 60. The washer 97 is bored to receive the reduced portion of pin 56.

A second washer 101 is arranged in the enlarged bore 61 and can be moved upwardly against shoulder 102. It is lifted by piston 54, after washer 97 has been lifted by pin 56, the distance of gap 103. This gap can be varied for different conditions and generally speaking, the longer it is the greater is the advance application of the trailer brakes, because the line pressure in pipe 21 is in the lower ranges—too low to actuate the tractor brakes. The other variable which contributes to a selected advance action of the trailer brakes is spring 104.

Spring 98 is the return spring so that after release of pedal 10, it assists in forcing piston 54 downwardly to exhaust fluid from chamber 30. I have found that a ten pound strength is adequate in most cases.

Springs 96 and 104 are free springs in that in the positions shown in Fig. 1 they exactly fit and are exerting no substantial pressure on their respective washers 97 and 101.

Spring 96 moves stem 81 and web 75 upwardly as hydraulic piston 54 moves upwardly. By increasing this spring strength the valve would be more quickly actuated and the trailer brakes would be increased in braking force with a low line pressure against piston 54. For example, it could be designed to give a trailer brake power of seven inches vacuum with a line pressure of fifty pounds.

Spring 104 effects a retarding of movement of piston 54 so that by varying the strength of spring 104 it is possible to get the desired correlation of vacuum pressure to any desired line or hydraulic pressure. This spring also plays a part in regulating how much advance action there is to be of the trailer brakes, because after piston 54 has moved upwardly into contact with washer 101 the hydraulic line pressure must build up before there is further actuation of either the trailer or tractor brakes.

This is the second stage of correlated action, and is effected in the main by the strength of spring 104. When it can begin is controlled by the length of gap 103.

In commercial production six different spring strengths for spring 104 are available. The first is designed to give maximum vacuum at 500 pounds line pressure. The others are adjusted to give maximum vacuum at 600, 700, 800, 900 and 1000 pounds line pressure. Other strengths, of course, may be used to obtain any desired line pressure to equal maximum trailer brake.

Usually it is not necessary to change springs 96 and 98 for these various adjustments between vacuum and line pressure.

When hydraulic piston 54 is at its highest position the upper end of pin 56 contacts washer 95 and effects a positive lifting of valve 91 from seat 71 in the event spring 96 has not already effected it. This assures maximum vacuum at the end of the work stroke.

The operation of this valve is as follows, starting with the parts in the off position shown in Fig. 1. In this position the air valve 91 is closed and the vacuum valve 86 is open allowing communication between chambers 67 and 64 through the diaphragm spider body 75. The hydraulic piston 54 is held down by spring 96 which in the example may be a ten pound spring. Springs 98 and 104 are free springs so that when piston 54 is as shown they are not exerting any pressure. Upon movement of piston 54 upwardly spring 98 first comes into action and spring 104 only acts after piston 54 has abutted the washer 101.

The action prior to piston 54 reaching washer 101 might be termed the first stage and preferably is arranged so that there is some actuation of the trailer brakes before the hydraulic line pressure is great enough to apply the tractor brakes. In the chart Fig. 3, are two typical situations—the full line showing 8 inches of vacuum for 50 pounds of line pressure and the dotted line showing 5 inches of vacuum for 50 pounds of line pressure. In these two hypothetical cases the individual brakes and conditions were such that a slight braking effort was obtained on the trailer brakes with the respective vacuum conditions and 50 pounds line pressure. With self-energized brakes on the tractor it may be necessary to have 8 inches of vacuum at 25 pounds line pressure. Whatever the relative pressures desired, the adjustment in this first stage is best obtained by changing the length of movement of piston 54 before it contacts washer 101. The longer this movement the more inches of vacuum before the tractor brakes are actuated. A more difficult way to obtain the adjustment is to change spring 96 or 98 or both.

Assuming now that pressure is present in the hydraulic system at 30, the piston 54 will be subject to this pressure. Its movement upward will first be resisted by springs 98 and 96 through the base of pin 56 and washer 97. As more line pressure is built up spring 96 lifts the diaphragm and attached stem, first to close the vacuum valve 86 on seat 87 and, as the movement of stem 81 continues, to open air valve 91. The latter valve will seat as soon as enough air is admitted to chamber 67 to overcome spring 96. In the meantime vacuum valve 86 remains closed. This preferably applies the trailer brakes.

If additional line pressure is built up in the hydraulic system to bring piston 54 into contact with washer 101, further movement of the piston 54 will be resisted by the additional force of spring 104. It is this spring 104 which principally determines the correlation between line pressures in the hydraulic system and the effective vacuum in the vacuum system on the trailer, for the second stage of the braking action. By using springs of varying strength maximum (see Fig. 3) vacuum can be obtained at different line pressures. Spring 104 is easily replaced by dropping the lower housing part 50.

The brakes on the trailer are applied as air is admitted to chamber 67 and to control line 39, 110; the strength of their application varies as the pressures in 67 and 64 are in balance principally with spring 96. In turn, the movement of spring 96 is effected by hydraulic line pressure as retarded principally by spring 104 in the second stage; and by spring 98 and 96 in the first stage.

An important feature of my invention is to obtain the proper balancing of effective vacuum pressure to pressure in the hydraulic line, for each stage of brake application, which I accomplish by spring 104; and by the amount of clearance at 103.

As the line pressure mounts in the hydraulic system, piston 54 overcomes springs 98 and 104, and pin 56 relieves spring 96 of its valve control function and effects a positive holding open of air valve 91.

When the hydraulic line pressure is relieved by releasing foot pedal 10, spring 98 returns washers 97, 101 against housing member 50. The vacuum in chamber 64 draws web 75 downwardly, seating valve 91, then allowing spring 88 to lift valve 86 off seat 87, after which a condition of balanced pressure is reestablished in chamber 67. This places the parts in the at rest or normal position of Fig. 1.

While I have illustrated an air suspended trailer type power chamber 31, requiring the conversion valve 38, the invention is as readily applicable to a vacuum suspended trailer system using a relay valve, and dispensing with the conversion valve. Also it is applicable to other mechanism requiring the correlated action of two differently actuated power applying means.

The valve 20 itself also could be made for air suspended operation by suitable reversal in a manner clear to the man skilled in the art with the present disclosure before him.

What I claim is:

1. In a brake system for a plurality of vehicles adapted to have the brakes actuated from one of said vehicles and wherein said last-named vehicle has a hydraulically controlled braking system and the other or others have a vacuum controlled system, the combination of a regulating valve having pressure sensitive means responsive to the line pressure in said hydraulic system, means for regulating the effective vacuum in the vacuum controlled brake system, means operatively connecting said pressure sensitive means and said last-named means, and means for yieldably retarding said pressure sensitive means after it has passed through a predetermined portion of its full movement, whereby the line pressure in said hydraulic system must be increased to effect further movement thereof.

2. In a brake system for a plurality of vehicles adapted to have the brakes actuated from one of said vehicles and wherein said last-named vehicle has a hydraulically controlled braking system and the other or others have a vacuum controlled system, the combination of a regulating valve having pressure sensitive means responsive to the line pressure in said hydraulic system, means for regulating the effective vacuum in the vacuum controlled brake system, means operatively connecting said pressure sensitive means and said last-named means, a first means for resisting movement of said pressure sensitive means, and a second means operative after a predetermined movement of said pressure sensitive means for increasing the resistance to the further movement thereof.

3. In a brake system for a plurality of vehicles adapted to have the brakes actuated from one of said vehicles and wherein said last-named vehicle has a hydraulically controlled braking system and the other or others have a vacuum controlled system, the combination of a regulating valve having pressure sensitive means responsive to the line pressure in said hydraulic system, means for regulating the effective vacuum in the vacuum controlled brake system, means operatively connecting said pressure sensitive means and said last-named means, a first means for resisting movement of said pressure sensitive means, a second means operative after a predetermined movement of said pressure sensitive means for increasing the resistance to the further movement thereof, and means for positively opening said vacuum regulating means when said pressure sensitive means is near the end of its brake applying stroke.

4. A valve for correlating the effective pressures in a hydraulically actuated mechanism and in mechanism responsive to air pressure, having means for regulating the air pressure effective in the air responsive mechanism, pressure sensitive means responding to the line pressure in the hydraulic system, means for resisting the initial movement of said pressure sensitive means, and means for adding to said resistance after a predetermined movement thereof.

5. A valve for correlating the effective pressures between a hydraulically actuated mechanism and mechanism responsive to air pressure, having a balanced valve for regulating the effective air pressure in the air responsive mechanism, a pressure sensitive means responding to the line pressure in the hydraulic mechanism, resilient means operatively connecting said valve and said pressure sensitive means, a pressure means resisting the movement of said pressure sensitive means, and means for increasing said resistance after a predetermined movement of said pressure sensitive means.

6. A valve for correlating the effective pressures between a hydraulically actuated mechanism and mechanism responsive to air pressure, having a balanced valve for regulating the effective air pressure in the air responsive mechanism, a pressure sensitive means responding to the line pressure in the hydraulic mechanism, a housing interposed between said valve and said pressure sensitive means, a ledge in said housing in the end adjacent said pressure sensitive means, a stop member resting on said ledge, a resilient member normally urging said stop member thereagainst, a shaft with a shoulder extending through said stop member and in contact with said pressure sensitive means, a washer fitted against the shoulder on said shaft and normally resting on said stop member, said shoulder thereby acting also to space said pressure sensitive means from said stop member, and resilient means effective between said washer and said balanced valve for actuating the latter.

7. A valve for correlating the effective pressures between a hydraulically actuated mechanism and mechanism responsive to air pressure, having a balanced valve for regulating the effective air pressure in the air responsive mechanism, a pressure sensitive means responding to the line pressure in the hydraulic mechanism, a housing interposed between said valve and said pressure sensitive means, a ledge in said housing in the end adjacent said pressure sensitive means, a stop member resting on said ledge, a resilient member normally urging said stop member thereagainst, a shaft with a shoulder extending through said stop member and in contact with said pressure sensitive means, a washer fitted against the shoulder on said shaft and normally resting on said stop member, resilient means effective between said washer and said balanced valve for actuating the latter, and resilient means effective between said washer and the end of said housing.

8. A valve for correlating the effective pressures between a hydraulically actuated mechanism and mechanism responsive to air pressure, having a balanced valve for regulating the effective air pressure in the air responsive mechanism, a pressure sensitive means responding to the line pressure in the hydraulic mechanism, a housing interposed between said valve and said pressure sensitive means, a ledge in said housing in the end adjacent said pressure sensitive means, a stop member resting on said ledge, a resilient member normally urging said stop member thereagainst, a shaft with a shoulder extending through said stop member and in contact with said pressure sensitive means, a washer fitted against the shoulder on said shaft and normally resting on said stop member, resilient means effective between said washer and said balanced valve for actuating the latter, and positively effective means between said pressure sensitive means and said balanced valve for actuating the latter when the former is near the end of its work stroke.

9. In a brake system for a plurality of vehicles adapted to have the brakes actuated from one of said vehicles and wherein said last-named vehicle has a hydraulically controlled braking system, and the other or others have a vacuum controlled system, the combination of a regulating valve having pressure sensitive means responsive to the line pressure in said hydraulic system, means for regulating the effective vacuum in the vacuum controlled brake system, means operatively connecting said pressure sensitive means and said last-named means, and means for temporarily halting said pressure sensitive means after it has passed through a predetermined portion of its full movement, whereby the line pressure in said hydraulic system must be increased to effect further movement thereof.

10. A valve for correlating the effective pressures in a hydraulically actuated mechanism and in mechanism responsive to air pressure, having means for regulating the air pressure effective in the air responsive mechanism, pressure sensitive means responding to the line pressure in the hydraulic system, means for resisting the movement of said pressure sensitive means having provision for increasing the resistance at predetermined stages whereby said movement is arrested at the beginning of each stage until the line pressure in the hydraulic system is increased enough to overcome said resistance.

11. A valve for correlating the effective pressures in a hydraulically actuated mechanism and in mechanism responsive to air pressure, having means for regulating the air pressure effective in the air responsive mechanism, pressure sensitive means responding to the line pressure in the hydraulic system, means for resisting the movement of said pressure sensitive means having provision for increasing the resistance at a predetermined stage whereby said movement is arrested at the beginning of said stage until the line pressure in the hydraulic system is increased enough to overcome said resistance.

12. A valve for correlating the effective pressures in a hydraulically actuated mechanism and in mechanism responsive to air pressure, having means for regulating the air pressure effective in the air responsive mechanism, pressure sensitive means responding to the line pressure in the hydraulic system and a plurality of means which are brought into operation successively for resisting the movement of said pressure sensitive means in predetermined stages.

CLARENCE A. CHRISTENSEN.